G. W. BARNARD.
Grain-Meter.
No. 218,216.   Patented Aug. 5, 1879.
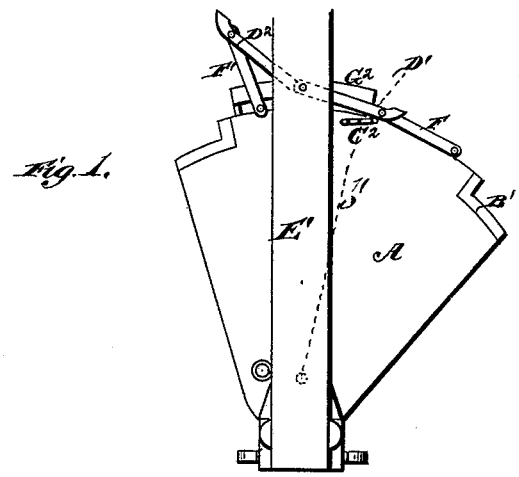
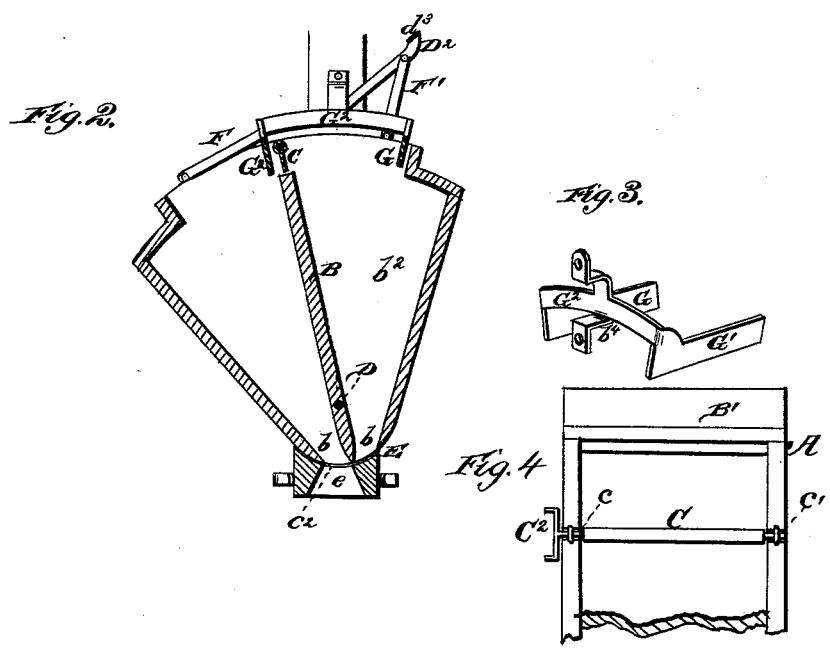

UNITED STATES PATENT OFFICE.

GEORGE W. BARNARD, OF ECONOMY, INDIANA.

IMPROVEMENT IN GRAIN-METERS.

Specification forming part of Letters Patent No. 218,216, dated August 5, 1879; application filed April 19, 1879.

*To all whom it may concern:*

Be it known that I, GEORGE W. BARNARD, of Economy, in the county of Wayne and State of Indiana, have invented a new and valuable Improvement in Automatic Grain-Measures; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my grain-measure. Fig. 2 is a vertical sectional view of the same. Fig. 3 is a perspective detail view; and Fig. 4 is a detail view, showing a plan of a portion of the measure and the T-headed journal.

This invention relates to automatic grain-measures; and it consists in the improvements in the construction of the same hereinafter fully described, and particularly pointed out in the claims.

A is the side of the measuring apparatus, which is preferably made of a quadrantal form. B is the partition, preferably so located that the compartments will contain an equal amount of grain. D are the journals which support the measuring apparatus, and are located some distance above the bottom of the same. E is the bottom piece, which receives the journals D, and is provided with an opening, $e$. The upper part of this bottom piece is cut concave upon a circle, $c^2$, of the same radii of the circle of the bottom of the measuring apparatus. This circle is described from the journals D as centers.

The bottoms of both compartments of the measuring apparatus are open, as shown at $b$, and the parts so constructed and arranged that as the radial line $b^1$ is vertical the opening in the bottom piece will partially open the measures, and as the apparatus is oscillated to the right the right measure will be opened, and when oscillated to the left the left measure will be opened.

B' is a curbing formed about the opening of the measures. C is a wicket or swinging portion of the partition B, hung on the journals $c\ c^1$. The journal $c^1$ has a T-formed arm, $C^2$, located in a horizontal position, as the wicket is in line with the partition.

$D^1\ D^2$ are levers pivoted to the upright E'. F F$^1$ are arms connecting the levers D$^1$ and D$^2$ with the measuring apparatus.

G G$^1$ are strokers held in position by the frame G$^2$, which is attached to the standard E', and are so located and constructed that they will carry any surplus grain from the one measure into the other as the measure oscillates beneath them.

When the measure $b^2$ is being filled by the flowing grain, the arm F$^1$ and the lever D$^2$ are resting upon the T-headed journal of the wicket, and the joint formed by the rod F$^1$ and arm D$^2$ tends slightly downward. As the surplus grain pushes against the wicket it causes it to swing, which trips the levers, and the weight of the grain in the filled measure $b^2$ oscillates the apparatus.

The arms D$^1$ D$^2$ are provided with the flanges $d^3$, which permit of but a slight downward inclination in the joint, which insures an easy trip by the T-headed journal of the wicket.

The operation of my invention is as follows: One of the measures being set under flowing grain, as soon as it is filled the surplus, pressing against the wicket C, causes one of the arms of the T-headed journal to unlock or trip the joint of the levers and arm connecting it to the measuring device, and the weight of the grain oscillates the device. As the overfull measure swings under the strokes, the surplus is carried into the empty measure, and the opposite measure locked in position.

The weight of the wicket is sufficient to return and retain it in its position; but the T-head may be actuated by passing under the piece $b^4$, (shown in Fig. 3,) and it may be retained somewhat in its place by frictional contact.

Having thus described my invention, what I claim as new, and desire to secure by Letters Patent, is—

1. In an automatic grain-measure, the vessel A, constructed as described, and provided with the vertical partition B, extending from the bottom to quite near the top of said vessel A, in combination with the fixed bottom E, having discharge $e$, the wicket C, swinging upon the T-headed journal C$^2$, and the arms D$^1$ D$^2$ and F$^1$ F$^2$, pivoted to the vessel A and to the upright E, as and for the purposes set forth.

2. In an automatic grain-measure, the combination of the strokers G G¹, secured to the post E' by the frame G², with the measuring-vessel A, constructed as described, as and for the purpose set forth.

3. In an apparatus for measuring grain, the wicket C, provided with the T-headed journal, in combination with the angled lever D and arms $d$, as and for the purposes set forth.

4. In an apparatus for measuring grain, the strokers G G, in combination with the upright and the oscillating measuring device, constructed and operating as and for the purposes set forth.

In testimony that I claim the above I have hereunto subscribed my name in the presence of two witnesses.

GEORGE WASHINGTON BARNARD.

Witnesses:
   ALONZO MARSHALL,
   JOSIAH OSBORN.